Dec. 1, 1942.  O. A. OSTBERG  2,303,858
MEASURING INSTRUMENT
Filed Dec. 4, 1941   3 Sheets-Sheet 1
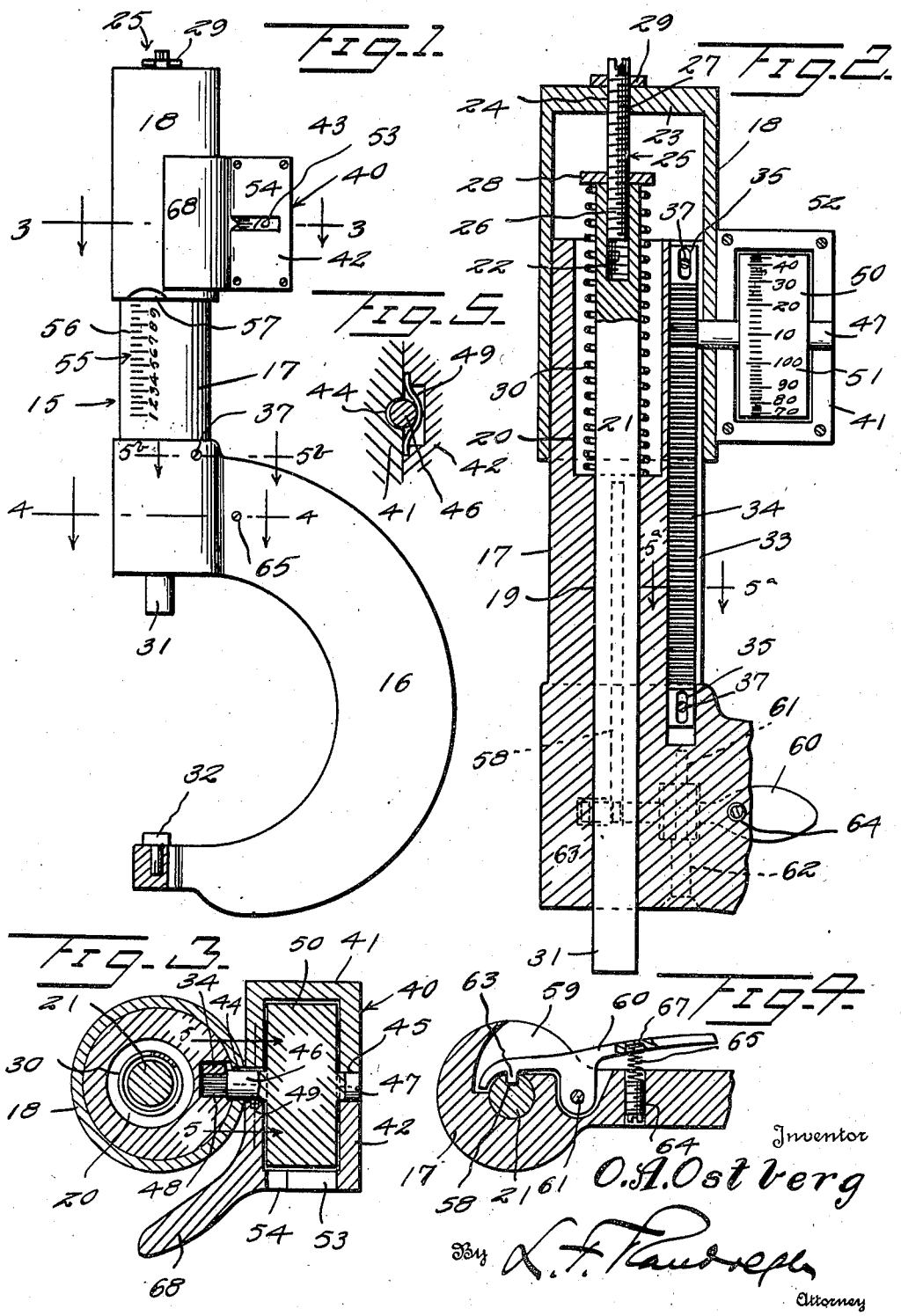
Inventor
O. A. Ostberg

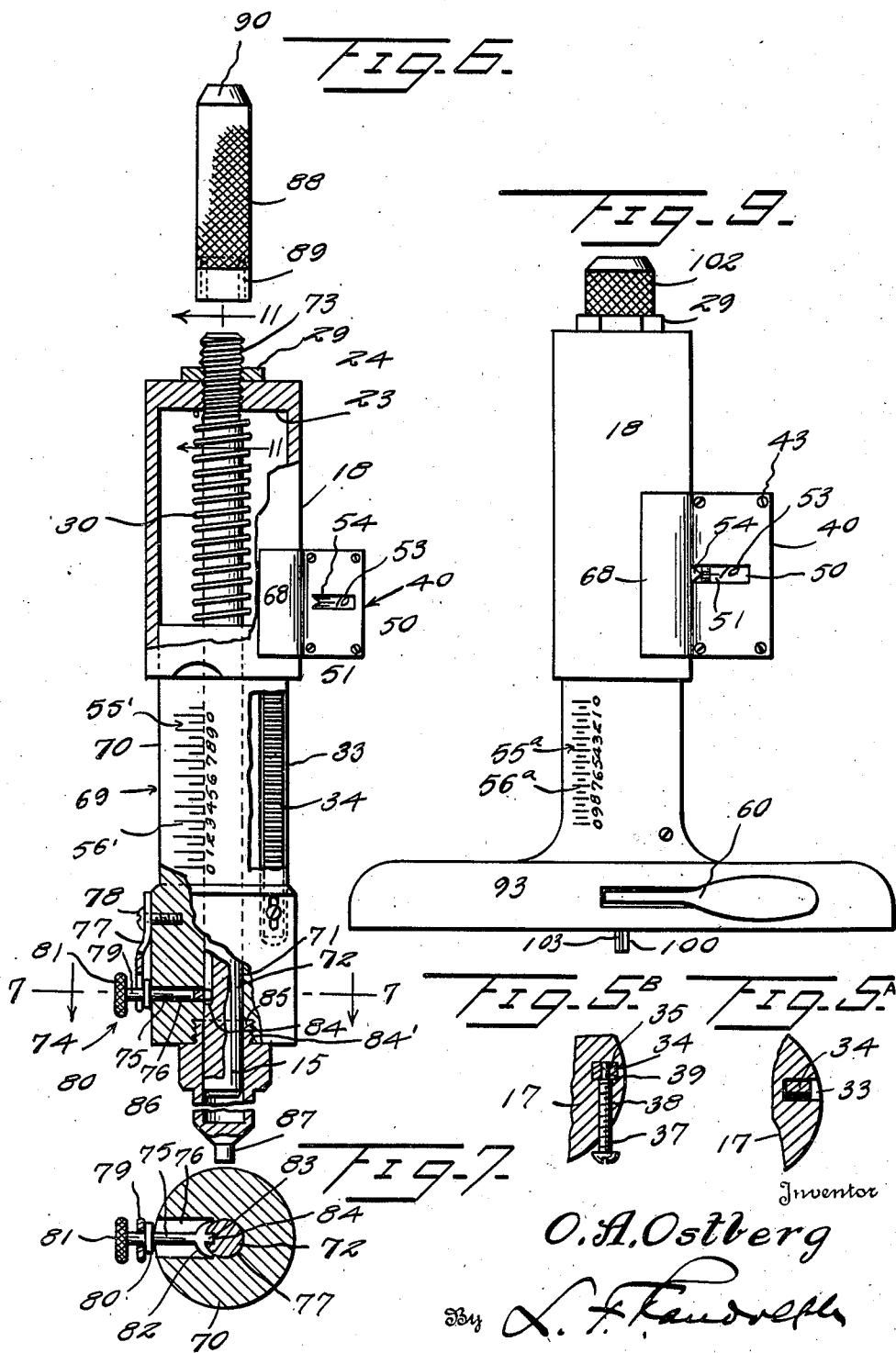

Dec. 1, 1942.   O. A. OSTBERG   2,303,858
MEASURING INSTRUMENT
Filed Dec. 4, 1941   3 Sheets-Sheet 3
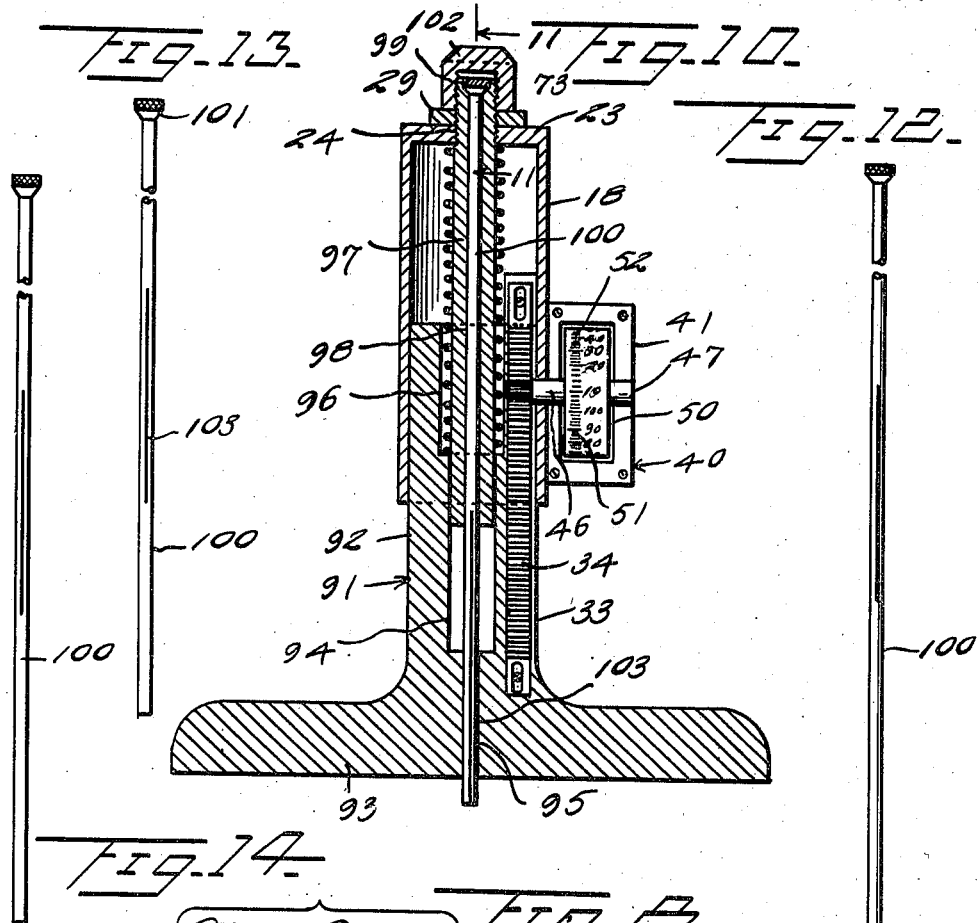
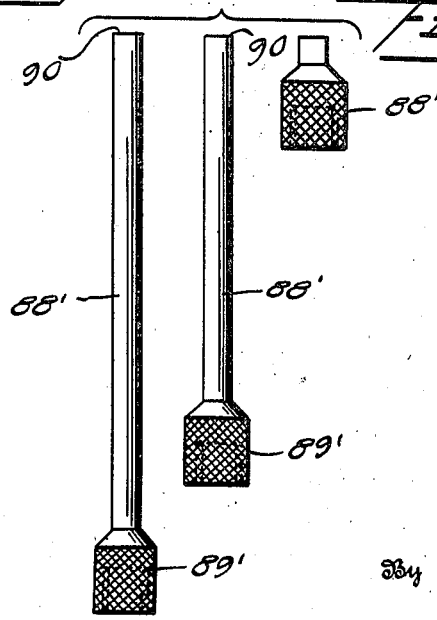
Inventor
O. A. Ostberg
By L. F. Randolph
Attorney Patented Dec. 1, 1942

2,303,858

UNITED STATES PATENT OFFICE 2,303,858

MEASURING INSTRUMENT

Olof A. Ostberg, Royal Oak, Mich.

Application December 4, 1941, Serial No. 421,680

8 Claims. (Cl. 33—147)

This invention relates to improvements in measuring instruments and more particularly to improvements in micrometer type measuring instruments such as micrometer calipers, inside micrometers and depth gauges.

More particularly, it is the aim of the invention to provide adjustment means for instruments of the above described character to compensate for wear on the faces of the parts thereof which engage the elements to be measured, and also to compensate for tension on said parts.

Another object of the invention is to provide means whereby the operator can quickly and accurately adjust the instrument for securing a measurement.

A further object of the invention is to provide locking means for holding the parts in adjusted positions to enable measurements to be retained after the instrument has been removed from the element measured, said locking means being releasable to permit the instrument to be automatically returned to a retracted position.

Other objects and advantages of the invention will hereinafter become apparent from the following description of the drawings, which illustrate preferred embodiments thereof, and wherein:

Figure 1 is a side elevational view showing the invention embodied in a micrometer caliper, Figure 2 is a longitudinal substantially central sectional view of a portion of the micrometer caliper and on an enlarged scale, Figures 3 and 4 are enlarged cross-sectional views taken substantially along the planes of the lines 3—3 and 4—4, respectively, of Figure 1, Figure 5 is a vertical sectional view of a portion of the micrometer caliper, taken substantially along a plane indicated by the line 5—5 of Figure 3, Figure 5A is a transverse sectional view through a portion of the sleeve of the micrometer caliper and taken substantially along the plane of the line 5ª—5ª of Figure 2, Figure 5B is a cross-sectional view taken substantially along the plane of the line 5ᵇ—5ᵇ of Figure 1, Figure 6 is a side elevational view, partly in section, showing the invention embodied in an inside micrometer, Figure 7 is a cross-sectional view of the same taken substantially along a plane indicated by the line 7—7 of Figure 6, Figure 8 is a view in side elevation showing a plurality of extension rods for use with the inside micrometer, Figure 9 is a side elevational view showing the invention embodied in a depth gauge, Figure 10 is a longitudinal substantially central vertical sectional view of the same, Figure 11 is a detailed sectional view of a portion of the inside micrometer taken substantially along a plane indicated by the line 11—11 of Figure 6, and Figures 12, 13 and 14 are side elevational views showing extension rods of different lengths which are adapted to be substituted for the extension rods shown in position in the depth gauge in Figure 10.

Referring more particularly to the drawings, wherein like reference characters designate like or corresponding parts throughout the different views, and referring particularly to Figures 1 to 5B, 15 designates generally a micrometer caliper constructed in accordance with the invention and including a frame 16, a sleeve 17 and a thimble 18. As seen in Figure 2, the sleeve 17 is provided with a longitudinally extending bore 19 which extends from end to end thereof and which is provided with an enlarged counterbored upper end 20.

A stem 21 extends through and is slidably disposed in the bore 19. Stem 21 is provided with a recess 22 which opens outwardly of the upper end thereof and which is provided with a left hand thread. The thimble 18 has an open end which slidably engages the upper end of the sleeve 17 and a closed upper end 23 which is disposed beyond the upper end of the sleeve 17. The end 23 is provided with an opening 24 which is provided with a right hand thread. A screw 25 is provided with a lower, left hand threaded end 26 which engages the thread of the recess 22 and an upper right hand threaded end 27 which engages the opening 24. It will be readily obvious that the screw 25 can be turned in one direction for moving the stem 21 toward the end 23 or in the opposite direction for moving said parts away from one another. A nut 28 threadedly engages the screw 25 and is adapted to bear against the upper end of stem 21. A nut 29 threadedly engages the upper end of the bolt 25 and bears against the outer side of the end 23. Nuts 28 and 29 retain the bolt or screw 25 in adjusted positions, to hold the thimble 18 in various adjusted positions relatively to the stem 21. An expansion coil spring 30 is mounted on the stem 21 and is disposed in the counterbored portion 20, with one end of the spring engaging against the inner end of the portion 20 and the opposite end of the spring bearing against the nut 28 for urging the stem 21 and thimble 18 upwardly relatively to the sleeve 17.

The caliper frame 16, at one end thereof, is formed integral with the lower end of the sleeve 17 and depends therefrom. The lower, outer end 31 of the stem 21 projects from the lower end of the sleeve 17 and into the opening of the frame 16. The opposite, free end of the frame 16 carries a removable anvil 32 which is disposed in opposed relationship to the stem end 31.

As seen in Figure 2, sleeve 17 has an elongated slot 33 which extends from adjacent its lower end through the upper end thereof and which opens laterally outwardly of sleeve 17 from near the lower end to the upper end thereof. A rack bar 34 is mounted in and extends substantially the length of slot 33 and is provided near its ends with longitudinally extending slots 35. The upper slot 35 engages a stud 36 which extends into said slot from the back side of bar 34 and which is loosely disposed therein. A set screw 37, as best seen in Figure 5B, engages a threaded opening 38 in the lower end of sleeve 17 and has a restricted shank 39 which extends into the lower slot 35. By loosening said screw 37 rack bar 34 can be slid longitudinally of slot 33 after which screw 37 is again tightened so that its inner end will bear against bar 34 for securing the bar in adjusted position.

A wheel housing 40 composed of sections 41 and 42 is mounted on the outer side of the thimble 18. Section 41 is preferably formed integral with thimble 18 and section 42 is detachably fastened to section 41 by fastenings 43. Thimble 18 and housing 40 are provided with aligned openings 44 and the housing 40 on its outer side has an opening 45 which also aligns with openings 44. A wheel 50 is loosely disposed in the housing 40 and is provided on opposite sides thereof with trunnions 46 and 47 which are journaled in openings 44 and 45, respectively. Trunnion 46 terminates in a pinion 48 which is disposed in slot 33 and which meshes with the teeth of rack bar 34. As best seen in Figure 5, the opening 44 of housing 40 has portions formed in both sections 41 and 42. Portion of opening 44, which is formed in section 42 is enlarged to accommodate a leaf spring 49, a portion of which bears against trunnion 46 to urge it in a direction for retaining pinion 48 in mesh with rack 34.

The rim or periphery of wheel 50 is provided with two corresponding calibrated portions 51 each of which extends one-half way around the wheel and each of which includes a plurality of scale markings 52 certain of which are designated by numerals "10, 20, etc." to "100." The housing section 42 is provided with a window or opening 53 in the outer portion thereof through which a portion of the calibrations 51 are visible. Section 42 is provided with a pointer 54 which extends into one end of window 53 and which is adapted to align with the scale markings 52, as best seen in Figure 1.

The intermediate portion of sleeve 17 is provided with a longitudinally disposed calibrated portion 55 including scale markings 56 alternate ones of which are numbered "1, 2, . . . 9, 0" from the lower toward the upper end of sleeve 17. The open end of thimble 18 is provided with a double portion forming an edge 57 which is disposed over the scale markings 56.

Stem 21 is provided with a longitudinally extending groove 58 which terminates short of the ends thereof. As seen in Figure 4 the lower end of sleeve 17 is recessed at 59 to receive a stop member 60 which is pivotally mounted intermediate of its ends on the stem portion 61 of a screw 62 which extends upwardly into the lower end of sleeve 17 and which engages a threaded opening therein, not shown. The pivotally mounted stop 60 is provided with a lug 63 near one end thereof which engages in groove 58. Frame 16 has a threaded opening 64 extending therethrough for adjustably receiving a threaded abutment member 65. One end of an expansion coil spring 66 extends into one end of the opening 64 and bears against an end of abutment 65. The inner side of the opposite end of stop 60 is provided with a recess 67 to receive the opposite end of spring 66. As seen in Figure 4, spring 66 urges stop 60 in a direction to move lug 63 inwardly of groove 58.

From the foregoing it will be obvious that an element, not shown, can be positioned in the opening of frame 16 between the parts 31 and 32 and can be measured by pressing downwardly on thimble 18. For this purpose housing 40 is provided with an extension forming a handle 68. The downward movement of thimble 18 will move the stem 21 downwardly until the element is engaged between the parts 31 and 32. As thimble 18 moves downwardly the edge 57 moves over the scale marking 56 and the wheel 50 is revolved by the pinion 48 moving relatively to rack 34. The teeth on the rack and pinion are sized so that wheel 50 will make one revolution while the thimble 18 is moving the distance between two adjacent numbered scale markings 56. Assuming that the length of the calibrated portion 55 is one inch, the numbered scale markings 56 will indicate tenths of inches. If, when the element to be measured is engaged between parts 31 and 32, the edge 57, for example, is between the scale markings designated by the numeral "7" and the one thereabove the element will measure slightly more than seven-tenths of an inch. The operator would then take the reading on the wheel 50 and assuming that it is "ten" as in Figure 1, the exact measurement will be .710 of an inch. Had the edge 57 been on the other side of the scale marking indicated by numeral "7" the reading taken from the wheel 50 would have been taken from the other calibrated portion 51 thereof. It will thus be readily apparent that readings to thousandths of an inch can be quickly and easily made with the micrometer caliper 15.

In order that the stem and thimble can be moved relatively to the sleeve, the last mentioned end of the stop 60 is pressed inwardly to move the outer end of lug 63 out of frictional engagement with the bed of groove 58. When the reading has been taken, stop 60 can be released and spring 66 will hold lug 63 in sufficiently tight engagement with the bed of the groove 58 to hold the instrument 15 in its adjusted position after the element, measured, has been removed therefrom so that the reading can be retained as long as required. Thus, stop 60 also functions as a locking member. When the stop is released spring 30 will move the thimble and stem upwardly until the lower end of groove 58 engages lug 63 at which time edge 57 will be over the scale marking 56 indicated by "0" as in Figure 1. The instrument 15 will then be again ready for use for taking another measurement.

In Figures 6, 7, 8 and 11 a slightly modified form of the invention is shown embodied in an inside micrometer, designated generally 69. The inside micrometer 69 includes a sleeve 70 having a bore 71 which extends longitudinally therethrough. A stem 72 is slidably mounted in the bore 71 and extends beyond the ends thereof. A thimble 18 is slidably mounted on the upper end of the sleeve 70 and said thimble corresponds to the thimble of the inside micrometer 15 and includes the housing 40 and the parts mounted therein and associated therewith. The sleeve 70 is provided with a slot 33 containing a rack bar 34, which is mounted in the same manner and which performs the same function as the rack bar 34 of the caliper 15.

Stem 72 is provided with an upper threaded end 73 which engages the threaded opening 24 of the closed end 23 of thimble 18 and which is adjustable relatively thereto for adjustably positioning thimble 18 relatively to sleeve 70 and stem 72. An expansion coil spring 30 is mounted on the upper portion of stem 72 and has one end bearing against the upper end of sleeve 70 and its opposite end bearing against end 23 for urging thimble 18 upwardly and outwardly of sleeve 70. A lock nut 29 engages the threaded portion 73 and bears against the outer side of end 23 for holding the thimble 18 and stem 72 in adjusted position.

The stop 60 of the caliper 15 is replaced by a stop 74 including a pin 75 which slidably engages a lateral bore 76 in the lower portion of sleeve 70 and which opens into bore 71. A leaf spring 77 is attached at one end thereof to sleeve 70 by a fastening 78 and has a bifurcated free end 79 which engages a pin 75 between a collar 80 and a knob 81 thereof. As best seen in Figure 7 pin 75 is provided with an arcuately shaped inner end 82 which bears against stem 72 and a lug 83 which projects therefrom into a groove 84 in stem 72 which corresponds to groove 58. Pin 75 and spring 77 combine to form lock and stop means 74 for the same purpose as the stop 60.

The lower end of bore 71 is counterbored and internally threaded as seen at 84 to receive the threaded end 85 of a recessed member 86 which is provided with an opposite, outer end 87 which is solid, hardened and lapped. The lower end of stem 72 slidably engages in the recessed member 86. An elongated rod or tube 88 is provided with an internally threaded socket end 89 which detachably engages the exposed end 73. The opposite end 90 of the member 88 is likewise hardened and lapped.

Sleeve 70 is provided with a calibrated portion 55' corresponding to the calibrated portion 55 except that the scale markings 56' thereof are numbered in the opposite direction, as seen in Figure 6. The relationship between the calibrated portion 55' and the calibrated portions 51 of the wheel 50 is the same as in the caliber 15.

For securing an inside measurement such as the diameter of the bore of a tube or pipe, the edge 57 of thimble 18 is set on the lower "0" marking 56'. The inside micrometer 69 is provided with members 86 and 88 of different lengths and members 86 and 88 are attached to the ends of the micrometer 69 so that the overall length thereof will be slightly less than the diameter of the bore to be measured. By then allowing the thimble 18 to move toward an extended position ends 87 and 90 will be moved into engagement with the parts to be measured and when in engagement therewith the measurement is obtained by adding the overall length of the micrometer 69 to the fractional inch measurement obtained from the calibrated portions 55' and 51, as heretofore described in detail.

As seen in Figures 8 and 11, extension rods 88' having socket ends 89' and hardened ends 90' may be used in lieu of the members 88.

In Figures 9, 10, 12, 13 and 14, another modified embodiment of the invention is shown in conjunction with a depth gauge 91 and which includes a sleeve 92 having an enlarged base 93 at the lower end thereof. Sleeve 92 has a bore extending longitudinally therethrough and which includes an intermediate portion 94 a restricted portion 95, in the base 93, and an enlarged upper portion 96. Sleeve 92 is provided with a slot 33 and rack bar 34 which is mounted in the same manner as the rack bar as the sleeve 17. A thimble 18 slidably engages the upper end of sleeve 92 and has a housing 40 and parts associated therewith which function in the same manner as in the previously described micrometers. A stem 97 slidably engages bore 94 and extends upwardly through bore portion 96 and has a threaded upper end 73 which is connected to end 23 of thimble 18 by threaded opening 24 therein and a lock nut 29 in the same manner and for the same purpose as in the inside micrometer.

Stem 97 has a longitudinal bore 98 which extends longitudinally therethrough and which is provided with an enlarged upper end 99. Bore 98 is adapted to removably receive rods 100 which extend therethrough and through the bore portion 95. Rods 100 are provided with heads 101 which seek in the bore portion 99 and which are releasably held in place therein by means of a cap 102 which engages the threaded end 73. The gauge 91, as seen in Figure 9, is provided with a lock and stop 60, corresponding to the stop 60 of a caliper 15, and which is mounted in the base 93. The rods 100 are provided with grooves 103 for the same purpose as the groove 58. Grooves 103 are all spaced the same distance from the headed ends 101 of the rods 100 which rods are of different lengths. Sleeve 92 is provided with a calibrated portion 55ª the scale markings 56ª of which are numbered from top to bottom.

Assuming that the depth of a hole to be measured, a rod 100 is mounted in the gauge 91 which is of a length so that it will extend almost to the bottom of the hole when the lower edge of the thimble 18 is on the upper "0" marking. By pushing down on handle 68 thimble 18 and rod 100 will be moved downwardly until the lower end of the rod engages the bottom of the hole. The measurement can then be obtained by combining the fractional inch measurement secured from the calibrated portions 55ª and 51 with the known length of the exposed end of the rod 100. The lock and stop 60 function in conjunction with the groove 103 in the same manner that groove 58 cooperates with stop 60 of the micrometer caliper 15.

Various modifications and changes in the embodiments of the invention as disclosed are contemplated and may obviously be resorted to, provided they fall within the spirit and scope of the invention as hereinafter defined by the appended claims.

I claim as my invention:

1. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, a caliper frame having one end thereof attached to one end of the sleeve, said elongated member having an end extending into the frame opening and an anvil mounted on the opposite end of the frame and in opposed relationship to said end of the elongated member.

2. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, and spring means for urging the thimble to an extended position relatively to the sleeve.

3. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, and means for adjustably positioning the elongated member relatively to the thimble and sleeve.

4. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, said sleeve having an enlarged base at one end thereof, and said elongated member having an end extending outwardly through the base and slidably disposed relatively thereto, said elongated member including a stem connected to the thimble and slidably disposed in the sleeve, a rod extending longitudinally through and removably mounted in the stem, said rod having an end projecting from the stem and forming said aforementioned end of the elongated member.

5. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, an extension detachably connected to the outer end of the sleeve and projecting therefrom, and an extension detachably connected to the outer end of the thimble and projecting outwardly therefrom.

6. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, an extension detachably connected to the outer end of the sleeve and projecting therefrom, and an extension detachably connected to the outer end of the thimble and projecting outwardly therefrom, said last mentioned extension forming a part of the elongated member.

7. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which th calibrations on the wheel are visible, means for locking the thimble and elongated member in various positions relatively to the sleeve, said locking means being releasable to permit the thimble to be returned to an extended position relatively to the sleeve, and the locking means, when released, forming a stop for limiting the movement of the thimble toward an extended position.

8. A measuring instrument comprising a sleeve, a thimble slidably mounted thereon, an elongated member connected to the thimble and movably disposed relatively to the sleeve, said sleeve having a calibrated portion, forming a linear scale, over which an end of the thimble is movable, said sleeve being provided with a rack, a housing mounted on the thimble, a shaft journaled in the housing and having a pinion on one end thereof in mesh with said rack, a wheel disposed in said housing, the rim of said wheel being calibrated and the calibrations thereof forming divisions of the calibrated portion of the sleeve, said housing having an opening through which the calibrations on the wheel are visible, and means for adjusting the rack for adjusting the calibrations of the wheel relatively to the calibrated portion of the sleeve.

OLOF A. OSTBERG.